United States Patent [19]

Palmin et al.

[11] Patent Number: 4,703,238
[45] Date of Patent: Oct. 27, 1987

[54] AMPLIFIER SYSTEM FOR D.C. MOTOR

[75] Inventors: Simyon Palmin, Sharon; Brian Hewson, North Attleboro, both of Mass.

[73] Assignee: Design Components, Incorporated, Franklin, Mass.

[21] Appl. No.: 2,797

[22] Filed: Jan. 13, 1987

[51] Int. Cl.$^4$ ................................................ G05B 9/02
[52] U.S. Cl. .................................... 318/563; 318/602; 318/681; 361/23
[58] Field of Search ............... 318/602, 624, 681, 563, 318/565; 361/23

[56] References Cited

U.S. PATENT DOCUMENTS

| | | | |
|---|---|---|---|
| 4,070,610 | 1/1978 | Rudich, Jr. | 318/624 X |
| 4,146,801 | 3/1979 | Vali et al. | 318/681 X |
| 4,189,732 | 2/1980 | Atwater | 318/681 X |
| 4,463,296 | 7/1984 | Tada et al. | 318/681 X |
| 4,481,452 | 11/1984 | Kitano et al. | 318/681 |
| 4,575,666 | 3/1986 | Nakashima et al. | 318/602 X |

OTHER PUBLICATIONS

Simyon Palmin, "Bipolar MOSFET Stepping Motor Drive Design," *Power Conversion International*, Oct. 1984, pp. 34–37.

"GL-1200 DC Motor Controller," Galil Motion Control, Inc., 3-1985.

*Primary Examiner*—Benjamin Dobeck
*Attorney, Agent, or Firm*—Wolf, Greenfield & Sacks

[57] ABSTRACT

An amplifier system for energizing a d.c. motor from a power source in response to an error signal includes a bridge circuit including a first switching transistor pair for supplying a first current from the power source through the motor in one direction and a second switching transistor pair for supplying a second current from the power source through the motor in the opposite direction. A zero crossing detector determines the sign of the error signal and enables the first transistor pair when the error is positive and enables the second transistor pair when the error is negative. A current sensing resistor senses the first and second currents through the motor and provides a motor current signal representative thereof. An absolute value circuit provides an absolute value error signal representative of the magnitude of the error signal. A comparator means compares the motor current signal with the absolute value error signal and inhibits both the first and second transistor pairs when the motor current signal exceeds the absolute value error signal, thereby deenergizing the motor.

7 Claims, 3 Drawing Figures

| # AMPLIFIER SYSTEM FOR D.C. MOTOR

FIELD OF THE INVENTION

This invention relates to apparatus for energizing d.c. motors and, more particularly, to an amplifier system for energizing d.c. motors with improved efficiency.

BACKGROUND OF THE INVENTION

D.C. motors are typically energized in a closed loop configuration including an amplifier for providing the required voltage and current to the motor, an encoder for sensing the actual position and velocity of the motor and a controller responsive to a command signal and to the position and velocity signals for generating an error signal. The command signal is supplied from a computer or other system controller and represents the desired motor position. The error signal is supplied to the amplifier and determines the required motor drive. The error signal is typically a bipolar voltage which represents the difference between the desired motor position and the actual motor position, including the sign of the difference.

Linear amplifiers are frequently used for driving d.c. motors. Linear amplifiers are relatively simple and provide a high degree of accuracy in a closed loop system. However, the efficiency decreases at low motor speed since the power not supplied to the motor is dissipated in the amplifier. Pulse width modulated (PWM) amplifier systems have also been used for driving d.c. motors. A variable duty cycle pulse train is supplied to the motor, the duty cycle varying in response to the error. When the error is zero, a fifty percent duty cycle square wave signal is supplied to the motor. PWM amplifiers are more efficient than linear amplifiers since the power transistors are switched on and off rather than operating in a linear region. In the on state, the transistor power dissipation is low because the voltage drop across it is low. In the off state, the transistor current is zero. Most of the power is dissipated during the transitions from on to off and off to on. However, PWM amplifiers are more complex and expensive than linear amplifiers and dissipate power even when the error is zero since a fifty percent duty cycle signal is supplied to the motor.

A stepping motor drive circuit utilizing a chopper power switching bridge circuit and a one-shot circuit for establishing a uniform chopper off time is described by S. Palmin in "Bipolar MOSFET Stepping Motor Drive Design," *Power Conversion International*, October 1984, pp. 34–37. The disclosed configuration is not applicable to d.c. motor drives since the drive requirements for stepper motors are substantially different from those of d.c. motors.

It is desirable to provide an amplifier system for energizing d.c. motors which overcomes some or all of the above disadvantages. The amplifier system should be compatible with existing controllers so that it can operate directly from conventional error signals.

It is a general object of the present invention to provide an improved amplifier system for d.c. motors.

It is another object of the present invention to provide a d.c. motor amplifier system having high efficiency.

It is a further object of the present invention to provide a d.c. motor amplifier system which is low in cost and easy to manufacture.

SUMMARY OF THE INVENTION

According to the present invention, these and other objects and advantages are achieved in apparatus for energizing a d.c. motor from a power source in response to an error signal. The apparatus includes motor driver means including a first switching means for supplying a first current from the power source through the motor in one direction, and a second switching means for supplying a second current from the power source through the motor in the opposite direction. A threshold detector means compares the error signal with a predetermined level representative of zero error, and enables the first switching means when the error signal is greater than the predetermined level, and enables the second switching means when the error signal is less than the predetermined level. A current sensing means senses the first and second currents through the motor and provides a motor current signal representative thereof. An absolute value circuit means provides an absolute value error signal representative of the absolute value of the difference between the error signal and the predetermined level. A comparator means compares the motor current signal with the absolute value error signal and provides an inhibit signal for inhibiting the first and second switching means when the motor current signal exceeds the absolute value error signal. As a result, the motor is deenergized when the motor current exceeds the error signal.

Preferably, the motor driver means includes a bridge circuit, and the first switching means comprises a first transistor pair for connecting the motor to the power source in one direction, and the second switching means comprises a second transistor pair for connecting the motor to the power source in the other direction. The current sensing means is preferably a resistor connected in series with the bridge circuit. The threshold detector means provides complementary sign signals for selectively enabling the first transistor pair or second transistor pair, depending on the sign of the error signal.

The apparatus can further include a logic circuit means associated with each of the transistor pairs. Each logic circuit means is responsive to the inhibit signal and one of the complementary sign signals for selectively enabling the first transistor, or the second transistor pair. A delay means is preferably coupled in series with the comparator means for inhibiting the motor driver means for a predetermined time after the comparator means initiates the inhibit signal, so as to stabilize the operation of the apparatus.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1:
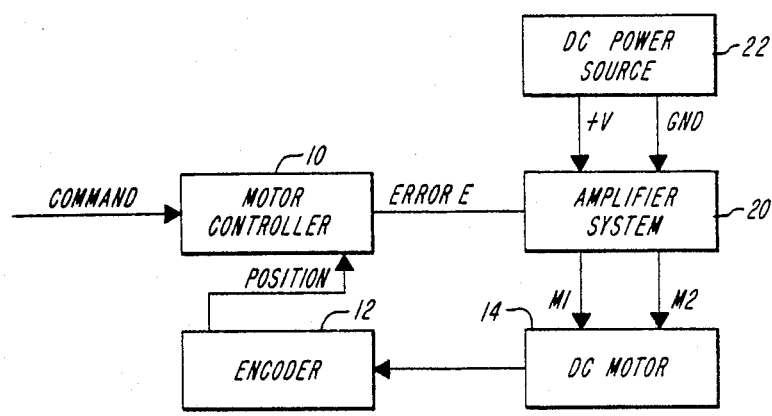
FIG. 1 is a block diagram of a d.c. motor system.

A d.c. motor system is shown in block diagram form in FIG. 1. A command signal representing a desired motor position is supplied from a host computer, or other system controller, to a motor controller 10. The motor controller 10 also receives a position input signal from an encoder 12. The encoder 12 is attached to a d.c. motor 14 and provides a position signal which represents the position of the motor 14. The motor controller 10 compares the actual motor position with the desired motor position and produces an error signal representative of the difference. The error signal is typically a bipolar analog signal in which zero volts represents zero error. In one preferred embodiment, the motor controller 10 utilizes a GL-1200 d.c. motor controller chip provided by Galil Motion Control, Inc. of Mountain View, Calif., and associated circuitry. The GL-1200 chip provides a position error signal and a system damping error signal which are summed to provide a motor error signal. It will be understood that any suitable motor controller having a motor error signal output can be utilized.

The error signal is supplied to an amplifier system 20, which receives d.c. power from a d.c. power source 22 and supplies power through its outputs to the d.c. motor 14. Typically, the d.c. power source 22 has an output in the range of 20–90 volts d.c. with a current capability of several amps. In prior art systems, the amplifier system 20 has been a linear amplifier or a pulse width modulated amplifier. In accordance with the present invention, the amplifier system 20 comprises an amplifier system as described in detail hereinafter.

Figure 2:
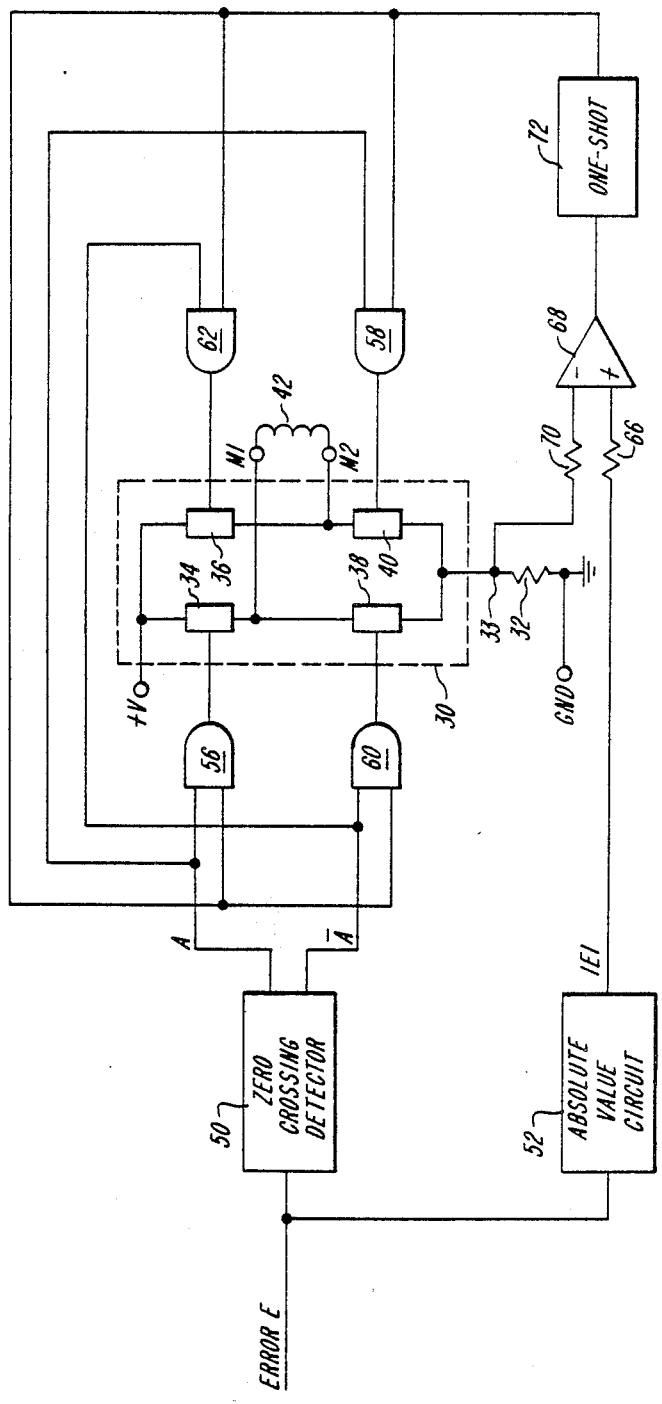
FIG. 2 is a schematic diagram of the amplifier system of the present invention.

The amplifier system of the present invention is illustrated in schematic form in FIG. 2. A motor driver circuit 30 comprises a bridge driver circuit connected between power source 22 and motor terminals M1 and M2. The power source 22 provides a voltage +V. A current sensing resistor 32 is connected between the ground terminal of the power source 22 and a low voltage terminal 33 of the bridge driver circuit 30. The bridge driver circuit 30 comprises a first switching device 34 having main terminals connected between voltage +V and motor terminal M1, a second switching device 36 having main terminals connected between voltage +V and motor terminal M2, a third switching device 38 having main terminals connected between motor terminal M1 and low voltage terminal 33, and a fourth switching device 40 having main terminals connected between motor terminal M2 and low voltage terminal 33. A motor winding 42 is connected across terminals M1 and M2. Each of the switching devices 34, 36, 38 and 40 further includes a control terminal and is typically a power transistor. The switching devices in the bridge circuit 30 are operated in pairs in order to supply current to the motor winding 42 in either direction. When switching devices 34 and 40 are both turned on, current is supplied to motor winding 42 from terminal M1 to terminal M2. When switching devices 36 and 38 are both turned on, current is supplied to motor winding 42 from terminal M2 to terminal M1. Thus, the bridge driver circuit 30 has the capability to supply current to the motor winding 42 in either direction. The switching devices 34, 36, 38 and 40 are selected to have a low power dissipation so that essentially the entire supply voltage +V is applied across the motor winding 42.

The error signal from the motor controller 10 is supplied to the input of a zero crossing detector 50 and to the input of an absolute value circuit 52. The zero crossing detector 50 has two complementary logic outputs, A and $\overline{A}$. Representing the error signal by E, the zero crossing detector 50 has the following outputs:

$E > 0$, $A = 1$ and $\overline{A} = 0$;

$E > 0$ $A = 0$ and $\overline{A} = 1$.

In this example, the value of $E = 0$ when the error is zero. Thus, the zero crossing detector 50 simply determines the sign of the motor error. It will be understood that E can be referenced to a nonzero voltage $E_0$ level, if desired. In this case, the voltage $E_0$ represents zero error in the position of the motor. The zero crossing detector 50 is described in more detail hereinafter.

The output signal A from the zero crossing detector 50 is connected to an input of a logic gate 56 and to an input of a logic gate 58. The outputs of the gates 56 and 58 are connected to the control inputs of the first switching device 34 and the fourth switching device 40, respectively. The complementary output $\overline{A}$ of the zero crossing detector 50 is connected to an input of a logic gate 60 and to an input of a logic gate 62. The outputs of the logic gates 60 and 62 are connected to the control inputs of the third switching device 38 and the second switching device 36, respectively.

The absolute value circuit 52 determines the magnitude of the error voltage E. That is, the output value $|E|$ always has the same sign, regardless of the sign of the input voltage, and has a voltage value equal to the absolute value of the input error signal E. The output $|E|$ of absolute value circuit 52 is connected through a resistor 66 to the noninverting input of a comparator 68. The low voltage terminal 33 of the bridge driver circuit 30 is connected through a resistor 70 to the inverting input of the comparator 68. The output of the comparator 68 is connected to the input of a one-shot circuit 72. The one-shot circuit 72 supplies a pulse of predetermined duration, typically 20–25 microseconds, at its output in response to a transition at its input. In the circuit of FIG. 2, the comparator 68 changes state and the one-shot circuit 72 is triggered when the voltage at the low voltage terminal 33 exceeds the voltage at $|E|$. The voltage developed across resistor 32 at low voltage terminal 33 represents the motor current. The output of one-shot circuit 72 is connected to a second input of each of the logic gates 56, 58, 60 and 62. The polarity of the pulse from one-shot circuit 72 and the type of logic gate 56, 58, 60, 62 are selected such that during the one-shot pulse, each of the gates 56, 58, 60 and 62 is inhibited and switching devices 34, 36, 38 and 40 are turned off. Thus, when the one-shot circuit 72 is active, no current is supplied to motor winding 42.

In operation, the zero crossing detector 50 enables the driver circuit 30 to supply current to the motor winding 42 in one direction or the opposite direction, depending on the sign of the error signal E. The complementary outputs A and $\overline{A}$ enable either the switching devices 34 and 40 or the switching devices 36 and 38. The motor current passes through the enabled switching devices and then through the resistor 32 which is typically a small value to reduce power dissipation. The motor current causes a voltage drop across the resistor 32 which is supplied to the comparator 68. The comparator 68 is also supplied with the absolute value of the error signal $|E|$. When the voltage across resistor 32 exceeds the absolute value error signal, the comparator 68 output changes state and triggers the one-shot circuit 72. The output pulse from the one-shot circuit 72 causes the logic gates 56, 58, 60 and 62 to be inhibited, thereby turning off all of the switching devices 34, 36, 38 and 40.

With no motor current, the voltage across the resistor 32 drops to zero and the comparator 68 is reset. The one-shot circuit 72 stabilizes the operation of the current sensing circuit and prevents the switching devices 34, 36, 38 and 40 from being turned on and off in an oscillatory manner. That is, once the comparator 68 is triggered, the switching devices are inhibited for at least the duration of the output pulse of the one-shot circuit 72.

The gain in the control loop shown in FIG. 1 is adjusted so that the error signal E has a desired proportionality to the motor current. Thus, for example, when resistor 32 is 0.16 ohm, the circuit constants can be adjusted so that a one-volt error signal requires a 6.25 amp motor current before the comparator 68 is triggered, while a two-volt error signal requires a 12.5 amp motor current before the comparator 68 is triggered. The proportionality constant can have any desired value. As the error increases, the motor current increases and vice versa. When the motor error is zero, the driver circuit 30 remains off and no power is dissipated in the motor 42 or the driver circuit 30, thereby greatly increasing operating efficiency.

It will be understood that a variety of configurations of the circuit of FIG. 2 are within the scope of the present invention. For example, switching devices 34, 36, 38, 40 can be bipolar transistors or field effect transistors. In one preferred embodiment, switching devices 34 and 36 are type IRF9532 MOSFETS manufactured by International Rectifier and switching devices 38 and 40 are type BUZ72A MOSFET transistors manufactured by Siemens. The comparator 68 can be a type LM393 and the gates 56, 58, 60 and 62 can be a type D469 high current quad power driver, manufactured by Siliconix.

Figure 3:
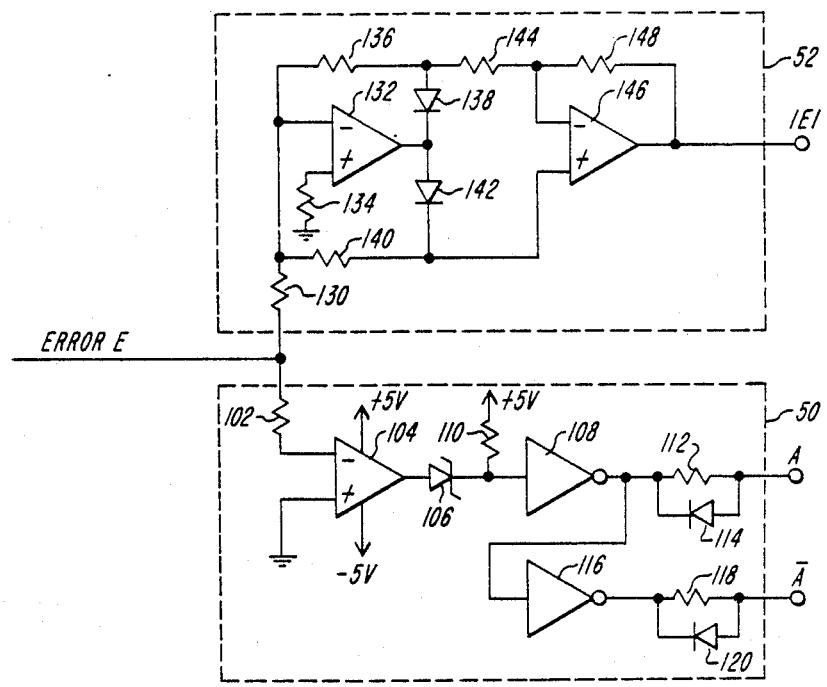
FIG. 3 is a schematic diagram of the absolute value circuit and the zero crossing detector of FIG. 2.

Circuit diagrams for the zero crossing detector 50 and the absolute value circuit 52 are shown in FIG. 3. In the zero crossing detector 50, the error signal E is supplied through a resistor 102 to the inverting input of an amplifier 104 which can be a type LM 358. The noninverting input of the amplifier 104 is connected to ground. The output of amplifier 104 is connected through a zener diode 106 to the input of a level detector 108 which can be a type LM 393. The input of level detector 108 is connected through a resistor 110 to supply voltage +5 volts. The output of level detector 108 is connected through a resistor 112 and a parallel-connected diode 114 to output A. The output of level detector 108 is also connected to the input of a level detector 116. The output of level detector 116 is connected through a resistor 118 and a parallel-connected diode 120 to output $\overline{A}$. In operation, the error signal is amplified by amplifier 104 and its polarity is detected by level detector 108, the output of which is a logic level. The inverted output is supplied by level detector 116 at output $\overline{A}$.

The error signal E is supplied to the absolute value circuit 52 through a resistor 130 to the inverting input of an amplifier 132. The noninverting input of amplifier 132 is connected through a resistor 134 to ground. A resistor 136 and a diode 138 are connected in series between the inverting input and the output terminal of the amplifier 132, so that the cathode of diode 138 is connected to the output terminal of amplifier 132. Similarly, a resistor 140 and a diode 142 are connected in series between the inverting input and the output terminal of amplifier 132 so that the anode of diode 142 is connected to the output terminal of amplifier 132. The anode of diode 138 is connected through a resistor 144 to the inverting input of an amplifier 146. The cathode of diode 142 is connected directly to the noninverting input of amplifier 146. A resistor 148 is connected between the output terminal of amplifier 146 and the inverting input. The output of amplifier 146 is the absolute value error signal $|E|$. Diodes 138 and 142 result in the output of amplifier 146 being positive, regardless of the polarity of the input error signal E.

The present invention provides an amplifier system for driving a d.c. motor which is relatively simple in construction and operation. In addition, the amplifier system reduces power consumption and improves operating efficiency relative to prior art amplifier systems.

While there has been shown and described what is at present considered the preferred embodiment of the present invention, it will be obvious to those skilled in the art that various changes and modifications may be made therein without departing from the scope of the invention as defined by the appended claims.

What is claimed is:

1. Apparatus for energizing a d.c. motor from a power source in response to an error signal comprising:
   motor driver means including a first switching means for supplying a first current from the power source through said motor in one direction and a second switching means for supplying a second current from the power source through said motor in the opposite direction;
   threshold detector means responsive to said error signal for comparing said error signal with a predetermined level representative of zero error and enabling the first switching means when said error signal is greater than said predetermined level and enabling the second switching means when said error signal is less than said predetermined level;
   current sensing means for sensing said first and second currents through said motor and providing a motor current signal representative thereof;
   absolute value circuit means responsive to said error signal for providing an absolute value signal representative of the absolute value of the difference between said error signal and said predetermined level; and
   comparator means for comparing said motor current signal with said absolute value signal and providing an inhibit signal for inhibiting said first and second switching means when said motor current signal exceeds said absolute value signal, whereby the motor is deenergized when the motor current signal exceeds the error signal.

2. Motor energizing apparatus as defined in claim 1 wherein said motor driver means includes a bridge circuit and said first switching means comprises a first transistor pair for selectable connection of said motor to said power source in said one direction and said second switching means comprises a second transistor pair for selectable connection of said motor to said power source in said other direction.

3. Motor energizing apparatus as defined in claim 2 wherein said current sensing means comprises a resistor connected in series with said bridge circuit.

4. Motor energizing apparatus as defined in claim 2 wherein said threshold detector means provides complementary sign signals for selectively enabling said first transistor pair or said second transistor pair depending on the sign of the error signal.

5. Motor energizing apparatus as defined in claim 4 wherein said predetermined level is zero volts.

6. Motor energizing apparatus as defined in claim 5 further including a logic circuit means associated with each of said transistor pairs, each logic circuit means being responsive to said inhibit signal and one of said complementary sign signals for selectively enabling said first transistor pair or said second transistor pair.

7. Motor energizing apparatus as defined in claim 1 further including delay means coupled to said comparator means for inhibiting said motor driver means for a predetermined time after said comparator means initiates said inhibit signal, so as to stabilize the operation of said apparatus.

* * * * *